US007383099B2

(12) United States Patent
Pollard et al.

(10) Patent No.: US 7,383,099 B2
(45) Date of Patent: Jun. 3, 2008

(54) APPARATUS FOR VENDING LOTTERY TICKETS

(75) Inventors: Douglas Earle Pollard, Manitoba (CA); Timothy Anthony Albert Janis, Manitoba (CA)

(73) Assignee: Pollard Banknote Limited Partnership, Winnipeg, Manitoba (CA)

( * ) Notice: Subject to any disclaimer, the term of this patent is extended or adjusted under 35 U.S.C. 154(b) by 267 days.

(21) Appl. No.: 11/252,184

(22) Filed: Oct. 18, 2005

(65) Prior Publication Data

US 2007/0088459 A1 Apr. 19, 2007

(51) Int. Cl.
*G06F 17/00* (2006.01)

(52) U.S. Cl. ...................... 700/232; 700/236; 700/242; 221/125

(58) Field of Classification Search ................ 700/236, 700/232, 242; 221/155
See application file for complete search history.

(56) References Cited

U.S. PATENT DOCUMENTS 5,143,193 A * 9/1992 Geraci ........................ 194/212
5,222,624 A 6/1993 Burr
5,408,417 A * 4/1995 Wilder .......................... 705/5
5,772,510 A * 6/1998 Roberts ....................... 463/17
5,816,918 A * 10/1998 Kelly et al. ................... 463/16
6,712,253 B2 3/2004 Hargrave et al.
6,714,838 B2 * 3/2004 Scrymgeour et al. ....... 700/242
6,751,525 B1 * 6/2004 Crisp, III .................... 700/241
D501,227 S * 1/2005 Boothe et al. ................. D20/2
6,932,258 B1 * 8/2005 Roberts et al. ............. 225/103

* cited by examiner

*Primary Examiner*—Gene O. Crawford
*Assistant Examiner*—Timothy R Waggoner
(74) *Attorney, Agent, or Firm*—Adrian D. Battison; Michael R. Williams; Ryan W. Dupuis

(57) ABSTRACT

A vending machine for lottery tickets includes an exterior housing for access by a purchasing customer and a secure interior within which is mounted a plurality of dispensing containers to dispense the one or more tickets as selected by the purchasing customer. A plurality of separate holders for printed ticket information are arranged in an array, each with a purchase switch and an information switch actuable by the customer. Graphic information is provided on a video display screen controlled by a control unit within the housing arranged to control the dispensing of the selected tickets and to display on the video display screen graphic information relating to a ticket in response to information switches actuated by the customer. The graphics on the screen can be actuated in response to a motion sensor detecting the presence of a customer. The screen serves also as a display screen for the authorized operator and thus can be moved to be viewed from outside or inside a door. The printed cards are illuminated by a row of LEDs. Complex graphics for the screen can be provided on a memory stick plugged into a USB port on the input interface.

20 Claims, 7 Drawing Sheets

APPARATUS FOR VENDING LOTTERY TICKETS

BACKGROUND OF THE INVENTION

Ticket vending machines for example those manufactured by Gtech Corporation of Rhode Island (previously under the name Interlott Technologies Inc of Cincinnati, Ohio) Pollard Banknote Limited of Winnipeg Canada (previously under the name American Games Inc. of Council Bluffs, Iowa) generally include an exterior housing which contains and secures the tickets and payment receptacle and which is accessible by customers for actuating switches on the housing for dispensing selected lottery tickets.

The lottery tickets are contained within separate containers within the housing each of which has a dispensing unit operable to dispense a ticket from a selected container in response to the actuation of the switches by the customer.

The control of the dispensing is effected by a control unit within the housing which is responsive to the actuation of the switches by the customers and responsive to the receipt of payment from the customers for dispensing the tickets.

Instant win lottery tickets can be provided either as scratch-off tickets or as pull tab (otherwise known as break-open) tickets. While the two above types of tickets are different in many respects both in regard to the manner of manufacture and in regard to methods of validation and control, the present invention is intended to be directed to both types of lottery tickets and the term “lottery ticket” as used herein is intended to cover both types and other types of lottery tickets which require dispensing in the same or similar manner as the above types.

Generally lottery tickets of the scratch off type are manufactured in a continuous strip which is then fan-folded for convenient supply. Generally break open type tickets are manufactured in individual ticket pieces which are then formed into a stack and dispensed one at a time from the bottom of the stack.

Machines for dispensing scratch off type tickets in fan folded form and machines for dispensing break open type tickets in stacked form have been available for many years. The construction, arrangement and operation of these machines is well known to one skilled in the art and is incorporated herein by reference.

In addition specific arrangements of dispensing arrangement proposed for use in a dispenser for the fan folded scratch off tickets are shown in U.S. Pat. No. 6,714,838 (Scrymgeour) and U.S. Pat. No. 6,712,253 (Hargrave) which are commonly owned with this application. The first of these shows an arrangement for entering data concerning the book of tickets to be introduced into the machine for dispensing by the machine and the second shows a dispensing arrangement for feeding an upper end of the strip of tickets to a feed system which acts to burst the perforations between each ticket and the next as each ticket is dispensed in turn. The construction and arrangement of these dispensing devices is incorporated herein by reference.

The dispensing machines are generally maintained on the premises of a retailer so that the retailer is charged with the responsibility of filling the containers as necessary to maintain a continuous supply without shortages which would potentially reduce sales. It is necessary therefore for the containers to be refilled on a periodic basis, either shortly after a container has become empty or in order to anticipate the container becoming empty. The service person therefore is required to check the inventory of a container and to top up the supply within each container which may be empty or approaching empty.

The apparatus includes a control unit which monitors the inventory and controls the dispensing of the tickets in response to the manual actuation of the switches by the customers and in response to the submission of suitable payment by the customers.

Furthermore the control unit controls the operation of the dispensing unit of each container so as to forward the ticket to be dispensed to the required dispensing location. In regard to the scratch off type tickets which are generally supplied in a continuous strip, it is generally desirable to effect a bursting of the perforations between each ticket and the next so as to allow an individual ticket to be dispensed into a chute. This avoids any possibility of a customer improperly tearing a ticket or being able to pull an extended number of tickets from the supply. In order to effect the bursting action, it is necessary for the dispensing unit to have information concerning the length of the ticket from its leading edge at the previous perforation line to the trailing edge at the next perforation line so as to move the perforation line to the bursting position and so as to dispense the ticket. In regard to the break open type tickets which are conventionally supplied in individual ticket form, it is also necessary for the control unit to have information concerning the length of the ticket in order to ensure that the ticket is properly dispensed.

The marketing of lottery ticket involves generating attractive tickets of different game types to successfully convince the customer to purchase the particular game.

In addition it is conventional to supply to the customers a selection of tickets of different prices so the customer may choose particular tickets not only based upon the attractiveness of the game but also upon the amount of money which the customer chooses to pay.

In order to provide the customer with an appealing array of tickets from which to purchase, the dispensing machine generally although not necessarily includes a number of containers which can vary depending upon the particular size of dispensing machine required for example from 12 dispensing containers up to 24 dispensing containers. Each container generally therefore will be filled with a different game for selection by the customers. Generally the game selection remains constant so that it is necessary only for the service person to maintain the containers properly filled by adding into each container a fresh supply of the tickets associated with that container. However in addition it also necessary on occasion to change the game associated with a respective container when older games are cancelled and new games are brought in to replace those older games. Lotteries release 50 to 80 new tickets per year and they want all of them to be in the ITVM while on sale in the marketplace, so the service reps will have to “change out” some containers or bins every few weeks.

The dispensing machine also should provide attractive graphics and information which assist in informing the customer of the games available and assist in completing the sale of such tickets. It is known therefore to provide a video screen on the machine which provides information on the tickets available. Commonly such screens are of the “touch screen” type so that the customer makes a selection and purchase by touching the graphic of the ticket selected. An example of a machine of this type which is proposed as one alternative for use with lottery tickets is shown in U.S. Pat. No. 5,408,417 (Wilder) issued Apr. 18$^{th}$, 1995.

An early example of a vending machine for lottery tickets which suggested the incorporation of a screen is that disclosed in U.S. Pat. No. 5,222,624 (Burr) issued Jun. 29th, 1993 where there is proposed that the tickets be displayed on a screen as an array of the tickets available. This proposal was suggested in replacement for the main proposal of the patent where the tickets themselves are visible through windows in the front of the housing. The display is thus limited to the array of tickets available and even suggests that the ticket of the array which is selected for dispensing have the graphic thereof move to simulate the dispensing.

SUMMARY OF THE INVENTION

It is one object of the present invention to provide an improved machine for vending lottery tickets.

The tickets defined herein can be of the scratch-off type or break-open type as well known to one skilled in the art. Commonly the scratch-off type tickets are dispensed from a continuous strip of the tickets connected end to end and the break-open tickets from a stack of the tickets. However this is not essential and the system for the dispensing from the containers can be selected as required.

According to a first aspect of the invention there is provided an apparatus for vending lottery tickets comprising:

a housing arranged for mounting at a location for vending of lottery tickets, the housing having an exterior surface for access by a purchasing customer and a secure interior;

a plurality of dispensing containers mounted within the secure interior, each arranged to receive a plurality of lottery tickets for dispensing of the tickets sequentially;

at least one dispensing device within the secure interior actuable to dispense the one or more tickets from the containers for receipt of the dispensed tickets by the purchasing customer;

a payment receiving device for effecting of a payment for selected tickets;

a plurality of separate display devices arranged so as to be visible on the outer surface of the housing in an array, each arranged for displaying graphics and information relating to a respective one of a plurality of different tickets available for purchase by the purchasing customer;

each display device having associated therewith a respective one of a plurality of customer actuated purchase switches actuable by the customer to effect purchase of the respective one of the plurality of different tickets;

each display device having associated therewith a respective one of a plurality of customer actuated information switches actuable by the customer;

a video display screen;

a control unit within the housing including a memory and arranged for:

controlling the dispensing of the respective one of the tickets in response to the actuation of a selected one of the purchase switches by the customer and the receipt of payment from the customer; and displaying from the memory on the video display screen graphic information relating to a respective one of the tickets in response to the actuation of a selected one of the information switches by the customer;

and a control input interface inside the secure interior for operation by an authorized operator.

The dispensing containers preferably are associated each with a respective one of a plurality of dispensing devices. However alternative arrangements may be included where one or more dispensing devices are provided each associated with more than one of the containers.

Preferably each of the display devices is arranged to provide a static display of information related to the respective ticket.

Preferably each of the display devices includes a printed card. However other types of display including a graphic displayed on a screen can be used.

Preferably each of the display devices includes a holder for the printed card.

Preferably each holder includes at least one LED light arranged on the holder so as to illuminate a front surface of the printed card.

Preferably each display device includes a transparent window in the exterior surface of the housing and a support surface for supporting the printed card behind the transparent window, the support surface defining a bottom edge and being inclined upwardly and rearwardly to define a slot at a top edge of the support surface into which the printed card can be inserted to rest against the support surface and each display device including a row of LED lights above the slot for illuminating the printed card.

Preferably each display device includes a display panel actuable to display a price for the respective ticket alongside the ticket information. This is preferably but not necessarily an LCD display which can be readily changed as required by the control unit.

Preferably the control unit is arranged such that the graphic display on the video display screen includes a set of rules for the game related to the respective ticket.

Preferably the control unit is arranged such that the graphic display on the video display screen includes a set of odds for the game related to the respective ticket.

Preferably the control unit is arranged such that the graphic display on the video display screen includes advertising material for the game related to the respective ticket.

Preferably the control unit is arranged such that the graphic display on the video display screen includes a prize structure for the game related to the respective ticket.

Preferably the control unit is arranged such that the graphic display on the video display screen relates only to the single ticket selected.

Preferably the control unit is arranged such that the graphic display on the video display screen includes audio related to the respective ticket.

Preferably the housing includes a door mounted for hinged pivotal movement about one edge which can be moved to an open position by an authorized operator for exposing the secure interior, wherein the control unit is arranged such that the control input interface includes a display on the video display screen and wherein the video display screen is mounted such that the video display screen can be viewed by the customer from the exterior with the door closed and can be viewed by the authorized operator with the door open.

Preferably the video display screen is mounted on the door and can be viewed by the customer from the exterior with the door closed through a transparent window in the door and wherein the video display screen is carried on a mounting which allows the video display screen to pivot relative to the door to face inwardly of the door to be viewed by the authorized operator with the door open. However other mounting arrangements may be used which allow the screen to be viewed in one position by the customer and another position by the authorized operator for the dual use of the screen.

Preferably the control input interface includes a keyboard for easier and more effective input of the required information by the authorized operator.

Preferably there is provided a motion sensor on the housing arranged to detect the presence of a customer approaching the housing and wherein the wherein the control unit is arranged such that the graphic display on the video display screen is changed in response to detection of the presence of a customer by the motion sensor.

Preferably the control input interface includes a USB port to receive graphic display information from a memory stick. Alternatively, information for the info button, or other display info for the video display screen, can be downloaded via a telephone line connected to a modem in the machine.

According to a second aspect of the invention there is provided an apparatus for vending lottery tickets comprising:

a housing arranged for mounting at a location for vending of lottery tickets, the housing having an exterior surface for access by a purchasing customer and a secure interior;

a plurality of dispensing containers mounted within the secure interior, each arranged to receive a plurality of lottery tickets for dispensing of the tickets sequentially;

at least one dispensing device within the secure interior actuable to dispense the one or more tickets from the containers for receipt of the dispensed tickets by the purchasing customer;

a payment receiving device for effecting of a payment for selected tickets;

a plurality of separate display devices arranged so as to be visible on the outer surface of the housing in an array, each arranged for displaying graphics and information relating to a respective one of a plurality of different tickets available for purchase by the purchasing customer;

a control unit within the housing including a memory and arranged for controlling the dispensing of the respective one of the tickets in response to the actuation of a selected one of a plurality of purchase switches by the customer;

and a control input interface inside the secure interior for operation by an authorized operator;

wherein each of the display devices includes a holder for a printed card;

and wherein each holder includes at least one LED light arranged on the holder so as to illuminate a front surface of the printed card.

According to a third aspect of the invention there is provided an apparatus for vending lottery tickets comprising:

a housing arranged for mounting at a location for vending of lottery tickets, the housing having an exterior surface for access by a purchasing customer and a secure interior;

a plurality of dispensing containers mounted within the secure interior, each arranged to receive a plurality of lottery tickets for dispensing of the tickets sequentially;

at least one dispensing device within the secure interior actuable to dispense the one or more tickets from the containers for receipt of the dispensed tickets by the purchasing customer;

a payment receiving device for effecting of a payment for selected tickets;

a plurality of display devices arranged so as to be visible on the outer surface of the housing in an array, each arranged for displaying graphics and information relating to a respective one of a plurality of different tickets available for purchase by the purchasing customer;

customer actuated purchase switches actuable by the customer to effect purchase of the respective one of the plurality of different tickets;

a video display screen;

a control unit within the housing including a memory and arranged for controlling the dispensing of the respective one of the tickets in response to the actuation of a selected one of the purchase switches by the customer and displaying from the memory on the video display screen graphic information relating to the tickets;

a control input interface inside the secure interior for operation by an authorized operator; and a motion sensor on the housing arranged to detect the presence of a customer approaching the housing and wherein the wherein the control unit is arranged such that the graphic display on the video display screen is changed in response to detection of the presence of a customer by the motion sensor.

According to a fourth aspect of the invention there is provided an apparatus for vending lottery tickets comprising:

a housing arranged for mounting at a location for vending of lottery tickets, the housing having an exterior surface for access by a purchasing customer and a secure interior;

a plurality of dispensing containers mounted within the secure interior, each arranged to receive a plurality of lottery tickets for dispensing of the tickets sequentially;

at least one dispensing device within the secure interior actuable to dispense the one or more tickets from the containers for receipt of the dispensed tickets by the purchasing customer;

a payment receiving device for effecting of a payment for selected tickets;

a plurality of display devices arranged so as to be visible on the outer surface of the housing in an array, each arranged for displaying graphics and information relating to a respective one of a plurality of different tickets available for purchase by the purchasing customer;

customer actuated purchase switches actuable by the customer to effect purchase of the respective one of the plurality of different tickets;

a video display screen;

a control unit within the housing including a memory and arranged for controlling the dispensing of the respective one of the tickets in response to the actuation of a selected one of the purchase switches by the customer and displaying from the memory on the video display screen graphic information relating to the tickets; and a control input interface inside the secure interior for operation by an authorized operator;

wherein the housing includes a door mounted for hinged pivotal movement about one edge which can be moved to an open position by an authorized operator for exposing the secure interior, wherein the control unit is arranged such that the control input interface includes a display on the video display screen;

and wherein the video display screen is mounted such that the video display screen can be viewed by the customer from the exterior with the door closed and can be viewed by the authorized operator with the door open.

BRIEF DESCRIPTION OF THE DRAWINGS

Embodiments of the invention will now be described in conjunction with the accompanying drawings in which.

In the drawings like characters of reference indicate corresponding parts in the different figures.

DESCRIPTION OF THE PREFERRED EMBODIMENTS

Figure 1:
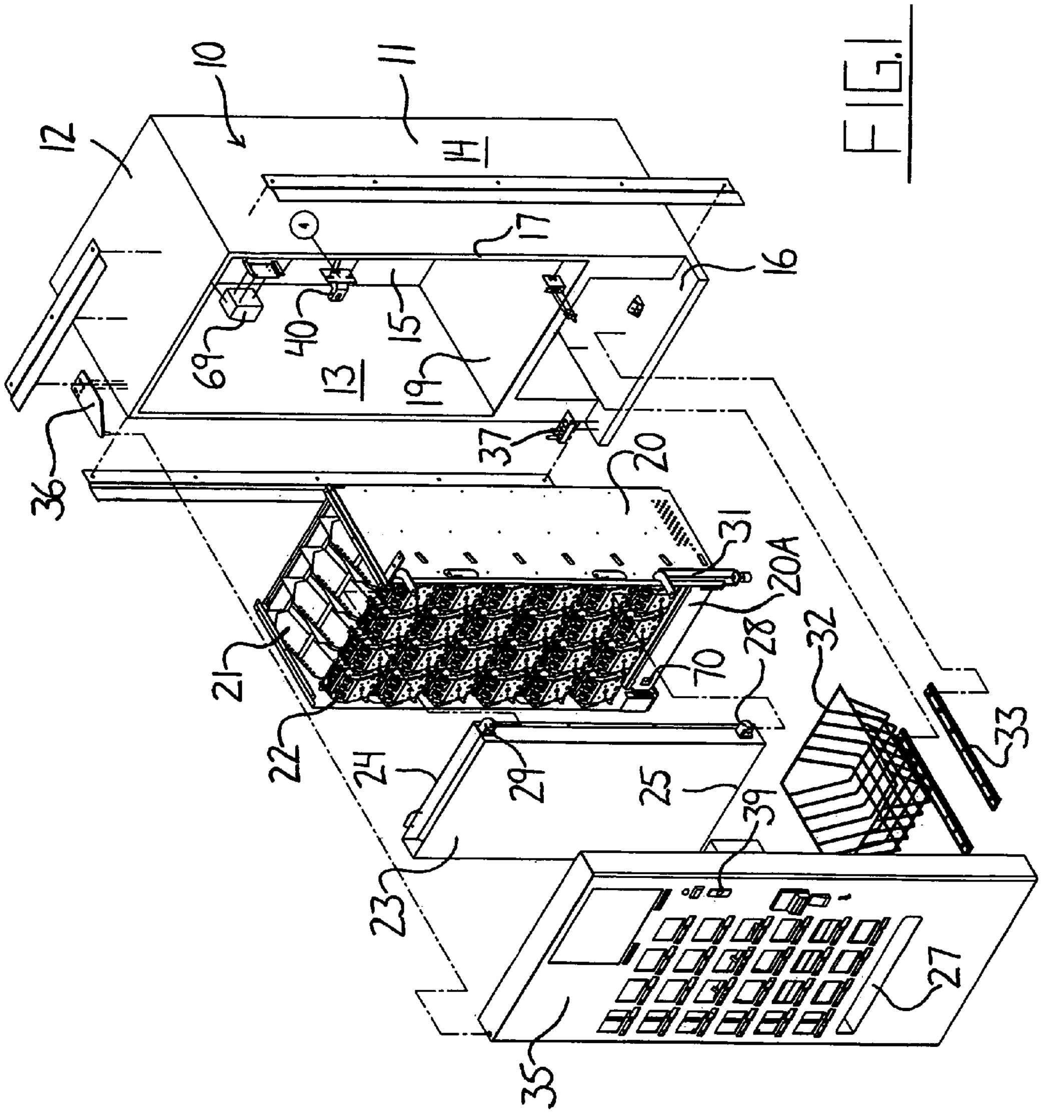
FIG. 1 is an exploded view of a vending machine according to the present invention.

The vending machine is generally indicated at 10 and includes a housing 11 with a top wall 12, side walls 13 and 14, a rear wall 15 and a bottom or base 16 defining an open front face 17. The base sits on the floor or on a suitable plinth at a suitable vending location thus presenting the housing to the potential customer and to an authorized operator of the machine.

The housing further includes a horizontal support panel 19 which supports a vending module 20 which is inserted into the housing and supported by the panel 19. The module 20 includes a series of containers 21 and a series of dispensing devices 22. These are arranged in an array of rows and columns. The dispensing devices are mounted in front of the containers and are arranged to engage and receive an upper one of a series of tickets stored in the respective container for dispensing the ticket for discharge to the customer as required.

At the bottom of the module 20 is located an electrical cabinet 20A which is mounted in a slide-out drawer and contains the control electronics for the dispensing devices and forms a part of the control system for the machine. It will be appreciated that the control electronics can be arranged in many different formats and constructions as will be well known to one skilled in the art so that the arrangement shown is one example only.

The arrangement of containers and dispensing devices can be similar to that disclosed in the above patents of the present assignee and other arrangements are well known to one skilled in the art so that further description of these elements is not necessary. In front of the dispensing module 20 is provided a dispensing chute 23 which provides a series of openings for receiving the dispensed tickets from the dispensing devices 22 in a rear wall 24 of the dispensing chute. The chute then provides control surfaces (not shown) which guide the dispensed tickets downwardly to a bottom mouth 25 which discharges into a receptacle 26 (FIG. 3) for supply of the tickets through a slot 27.

The dispensing chute 23 is mounted on hinges 28 and 29 at the right hand side of the chute which are carried on supports 30 and 31 of the module 20 so that the dispensing chute 23 can pivot from a closed position over the front of the module 20 to an open position exposing the front of the module for access and service. The dispensing chute includes a suitable latch arrangement which holds it in place in the closed position during the normal vending action.

Underneath the panel 19 is provided a storage basket 32 which is mounted on slides 33 allowing it to be inserted and removed from the compartment underneath the panel 19. The basket provides storage for materials to be used in the interior of the machine by the authorized operator.

A door 35 is provided which can be moved from a closed position covering the open front face 17 to an open position allowing access to the interior of the housing. The door is mounted on brackets 36 and 37 attached to the side of the housing 11 which is the left hand side as viewed from the front so that the hinge for the door is located opposite the hinge for the dispensing chute 23. A locking arrangement 38 is mounted on the inside surface of the door 35 and is operable through a key slot 39 on the front face to engage and incorporate a suitable lock retainer 40 carried on the inside surface of the housing.

With the door 35 locked in place on the open front face 17 of the housing 11, the interior of the housing is secured so as to be inaccessible to the customer and accessible only to the authorized operator having access to the key which will unlock and open the front door.

Figure 2:
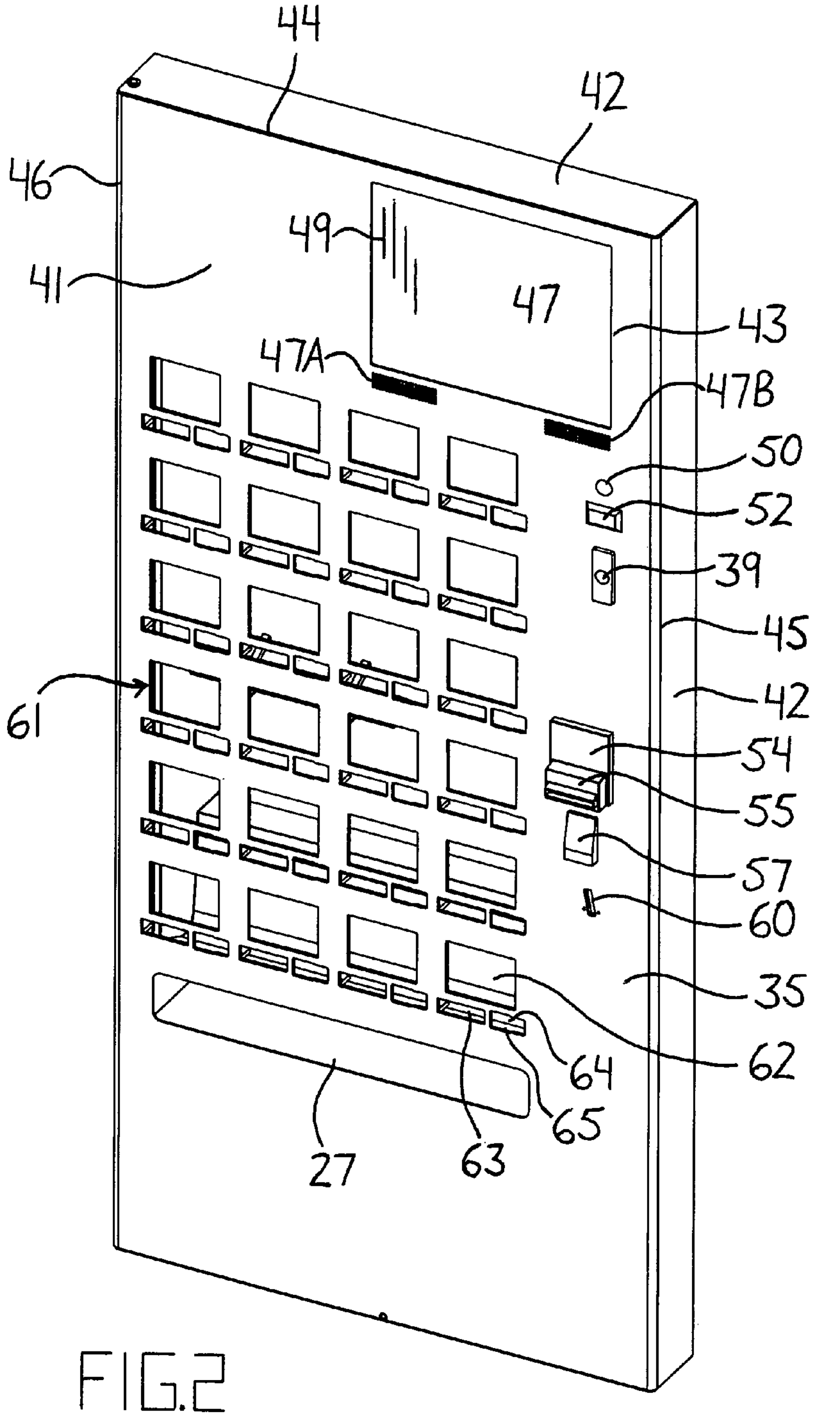
FIG. 2 is a front elevational view of the machine of FIG. 1.

The door as best shown in FIG. 2 includes a front flat panel 41 and right angle flanges 42 at the top, bottom and side edges which extend rearwardly from the front panel 41 toward the front face 17 to cooperate with the front face in the closing action. The door thus provides a shallow hollow receptacle for the components carried on the door which are thus contained and protected by the structure of the door. The rear surface of the door is however open to allow direct access to the rear surface by the operator when the door is opened.

Figure 3:
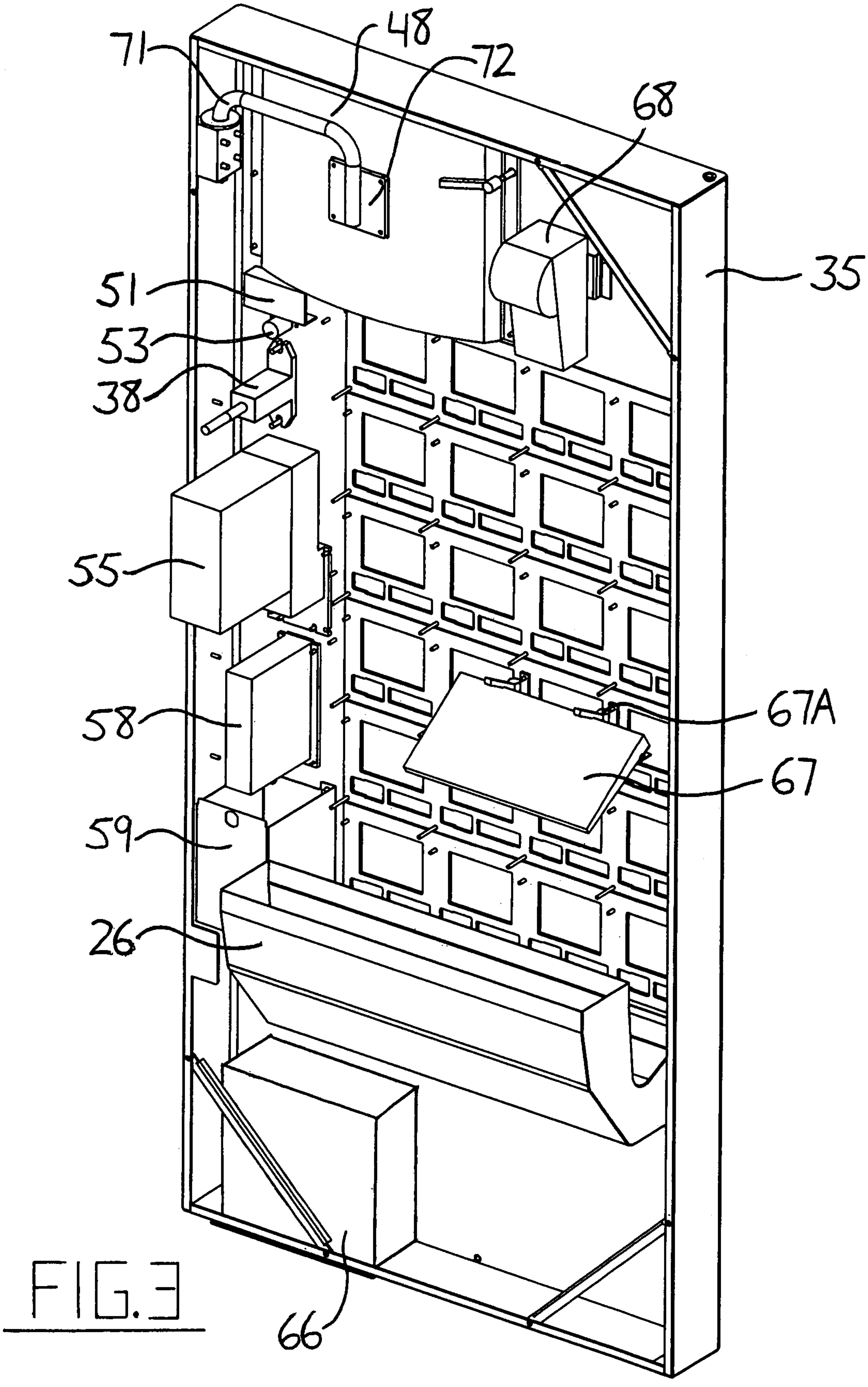
FIG. 3 is a rear elevational view of the front door only of the machine of FIG. 1.

The door panel 41 is cut to form a series of openings to receive a number of components which are presented through the front panel 41 to the customer to provide an attractive vending appearance to the customer. The height of the door is such that the upper edge is approximately at or slightly above eye height so that the openings in the door are readily accessible to the customer. An upper most one of the openings is indicated at 43 and is provided immediately adjacent a top edge 44 of the door. For convenience of the internal structure, the opening 43 is located adjacent the lock side 45 of the door and away from the hinge side 46. The opening 43 is generally rectangular with horizontal top and bottom edges and vertical side edges and is dimensioned to just receive the front face of a video display screen 47 of a conventional LCD computer display 48 (FIG. 3). The screen 47 is covered by a transparent panel 49 so that the front sheet 41 and the panel 49 provide a closure for the front surface allowing viewing of the screen 47 but no access to that screen.

On the front face is provided a further opening 50 which allows penetration through the front panel of a beam from a motion sensor 51. Below the motion sensor 51 is provided an opening 52 at which is located a switch 53 known in the industry as a "maxim" switch which is used by the player for dispensing a maximum number of a selected ticket in dependence upon the amount of money received within the machine. These arrangements are well known and do not need to be described in more detail.

Below the lock 39 is provided a further opening 54 at which is mounted a bill acceptor 55 by which a customer can insert payment into the machine using paper bills. Below the bill acceptor 55 is provided a coin slot 57 which provides an entry into a coin receptor 58 on the rear surface which drops accepted coins into a coin box 59 or returns coins to a coin return slot 60 on the front face.

It will be appreciated that each of these elements is of course well known in the vending industry so that further description is not required.

Also visible in FIG. 2 and in the reverse on FIG. 3 is the dispensing slot and dispensing receptacle 26 and 27 which receive the tickets discharged from the chute 23 and presents them through the slot 27 to the customer after a purchase has been made.

In the area above the slot 27 and below the bottom edge of the opening 43 is provided an array of display devices generally indicated at 61. This array generally matches the array of the dispensing containers so that the same number of display devices is provided as the number of dispensing containers. In the embodiment shown, the display devices are arranged in array of rows and columns where there are six rows and four columns making a total of twenty four display devices available to display information relating to particular tickets. This array corresponds to the array of four columns and six rows of the dispensing containers and it will be appreciated that this is a particularly convenient arrangement to allow the operator to co-ordinate the display of a ticket with the associated vending container with a low level of confusion. However the display devices do not allow viewing of the dispensing devices themselves but merely a display on the exterior of the front panel 41 which allows the customer to view the tickets available for sale.

Each display device comprises a holder 62 for a printed card which displays basic information concerning the ticket to be vended. Underneath the printed card at the holder 62 is provided a visual display 63 in the form of a suitable digital display element such as LCD at which the price of the associated ticket can be displayed in numerical terms. Alongside the display 63 is provided a pair of switches 64 and 65 which are simple depress switches which can be actuated by the customer when the customer has made a selection of a ticket in which the customer has some interest. The two switches 64 and 65 are marked "info" and "purchase". Switches are mounted one beside the other immediately accessible without any confusion as to which display they relate and with the operation of the switch clearly marked on the front face of the switch.

On the rear of the door is mounted a computer console generally indicated at 66 which is connected by a suitable control wiring to the various components including the display screen 48, the bill acceptor 55, the coin receptacle 58, the switches 63 and 64 and the dispensing units 22. The computer console also is connected to a keyboard 67 by which the authorized operator can input information into the computer system. In addition there is provided a printer 68 which can print paper receipts for inventory control. In addition there is provided a bar code reader 69 which is connected to the computer console for input of data from bar codes provided on game set up cards as described in more detail in the above patent of the present assignees, the disclosure of which is incorporated herein by reference. The game set up cards are located on the front face of the dispensing devices 22 so as to be associated with and identify the respective dispensing device and its associated container.

Yet further there is provided a USB port 70 which provides an input into the computer. This is conveniently mounted on the electrical cabinet 20A as shown but can be positioned at any convenient location at or adjacent the dispensing containers. Thus the video display, the keyboard, the printer, the bar code reader and the USB port all form part of a control input interface located inside the secure interior for operation by the authorized operator when loading refill packs of tickets or when loading new games including new ticket packs.

Figure 7:
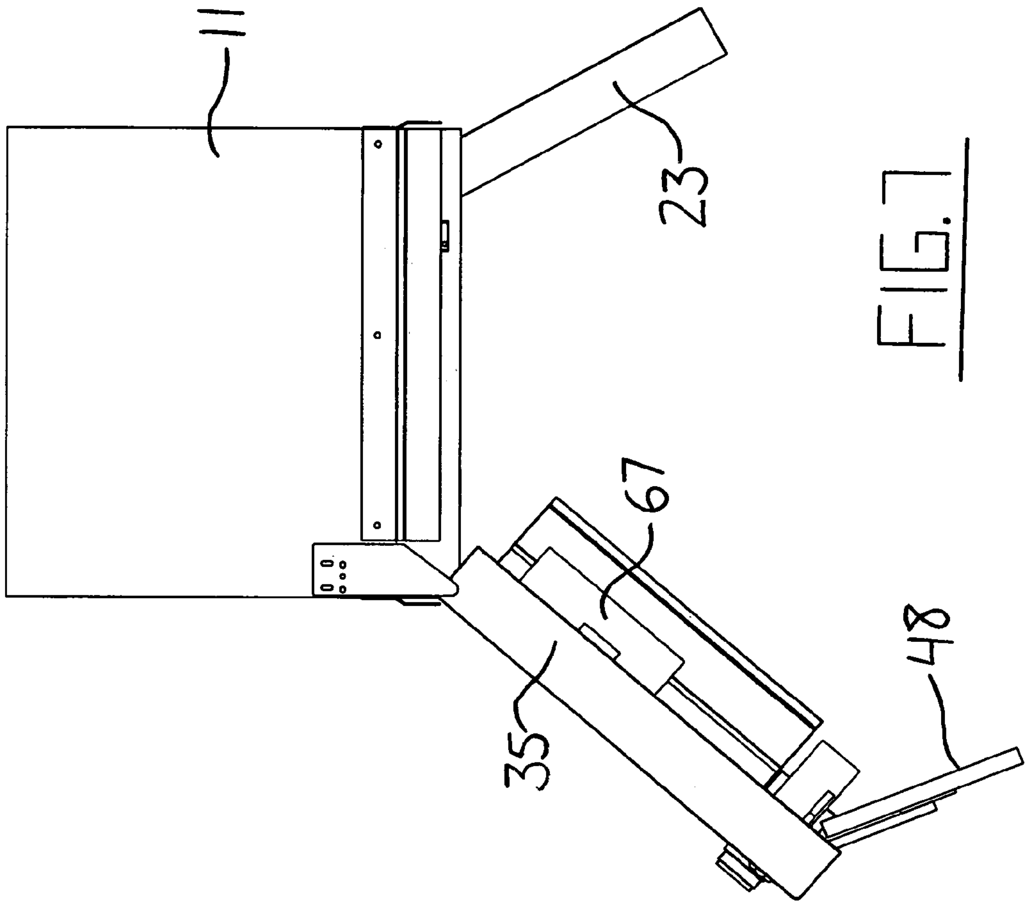
FIG. 7 is a top plan view of the machine of FIG. 1 in the open position of the door allowing access by the authorized operator to the secure interior of the machine.

The video display screen 48 is mounted on a swinging bracket 71 which is hinged to the rear of the display screen at a coupling 72 and is hinged to the inside flange of the door at a support 73. This allows the video display screen to be moved from a dispensing position in which the front surface of the screen is presented at the opening 43 to a position in which the screen 47 faces inside the door. This position is shown in FIG. 7 in which a loading and service position of the machine is shown in which the housing 11 has the front face 17 exposed by opening of the door 35 and by opening of the dispensing chute 23. In this position the operator can stand in front of the front face 17 and between the door 35 and the dispensing chute 23 and can access the interface within the machine. Thus the screen 48 is shown at a position facing the operator in front of the open face 17 with the operator able to active the keyboard 67 presented at a suitable location on the inside of the door 35. The keyboard 67 is mounted on hinges 67A which allow it to be folded downwardly to a flat position against the rear surface of the door or pivoted so it is inclined upwardly and outwardly in the conventional orientation of a keyboard. Thus, with the door open, the authorized operator can enter tickets into the containers and suitable arranged for them to be dispensed at the required locations by the dispensers from the particular containers.

As set forth in the above patent, data relating to the tickets can be input into the computer using the input interface so that the computer acts as a control unit controlling the dispensing of the tickets when the customer makes a selection. The control unit provides the necessary data for dispensing particular tickets of a particular length and arrangement thus controlling the dispensing units in dependence upon the data input into the control unit relating to those tickets.

The keyboard and the full size screen which form of a conventional PC allow the operator to input the necessary data quickly and easily using techniques are well known to persons familiar with a computer.

When the loading is complete the video screen is returned to its initial position presented at the opening 43 and the dispensing chute 23 and the door 35 are closed thus again securing the interior.

The control unit defined by the computer then acts to control the operation of the dispensing machine.

The control unit acts therefore to display on the screen 47 a generic message relating to the lottery which is generally a static graphic. However, on detection of the presence of a person in the vicinity of the machine as detected by the motion sensor 51, the control unit is activated to apply onto the video screen a moving graphic which provides an initial incentive for the customer to apply attention to the machine. The initial moving graphic is generally not related to any particular ticket but is simply an initial advertisement which can include audio broadcast through speakers 47A and 47B mounted on the front face 41 of the door adjacent the screen 47. The video and the audio required for the advertisement are stored in a memory module or hard drive in the computer.

Once the attention of the customers attracted to the machine, the customer has the option of selecting from any one of the tickets in the array of disclosed tickets. The array discloses basic information relating to the ticket including basic graphics of relatively small size which are displayed on the printed card presented at the windows forming the array. In addition the price is displayed on the LCD display 63.

In the event that the customer wishes to purchase a ticket, this purchase can be simply effected by the customer depressing the purchase button 65 immediately adjacent the ticket concerned. The system is very simple and thus is not in any way intimidating since the person merely views the ticket concerned and presses the button immediately adjacent to it without any necessity for interacting with any complex technology.

In the event that the customer wishes to obtain more information concerning the ticket, the customer can depress the second button 64 which is again immediately adjacent the ticket concerned. In this case the control unit accesses information relating to that ticket and displays the information on the video display screen.

As the video display screen is relatively large in comparison with the size of the individual windows, much more information can be displayed on a video display screen. This can include a series of graphics which present the following information.

A set of rules for the game.

A set of odds for the prizes on the game.

Advertising material for the game concerned.

A prize structure for the game concerned.

The information displayed relates only to the single ticket concerned so that the customer is not in anyway confused. The advertising material and any of the other graphics can include audio. The advertising material can be similar to or identical to television or other promotional material which will therefore be familiar to the customer from advertising campaigns.

The vending system is very effective in that it maintains a low level of complexity for the customer, it provides information relating to each of the tickets concerned in a relatively simple stationary graphic form and in addition it provides the ability of the customer to access much more information on a video screen which therefore allows high intensity and highly attractive graphics to be used.

The provision of the USB port in the machine allows the operator, when loading a new game, to load into the memory of the computer the graphics necessary for the display screen using a commercially available memory stick which carries those graphics. Thus the machine can be quickly configured for different or new games and yet provides highly effective sales material to the customer, should the customer so desire. In the alternative, the customer can simply activate the immediate purchase using the purchase button or the maxim button if the customer is already decided upon the purchase to be made.

Figure 4:
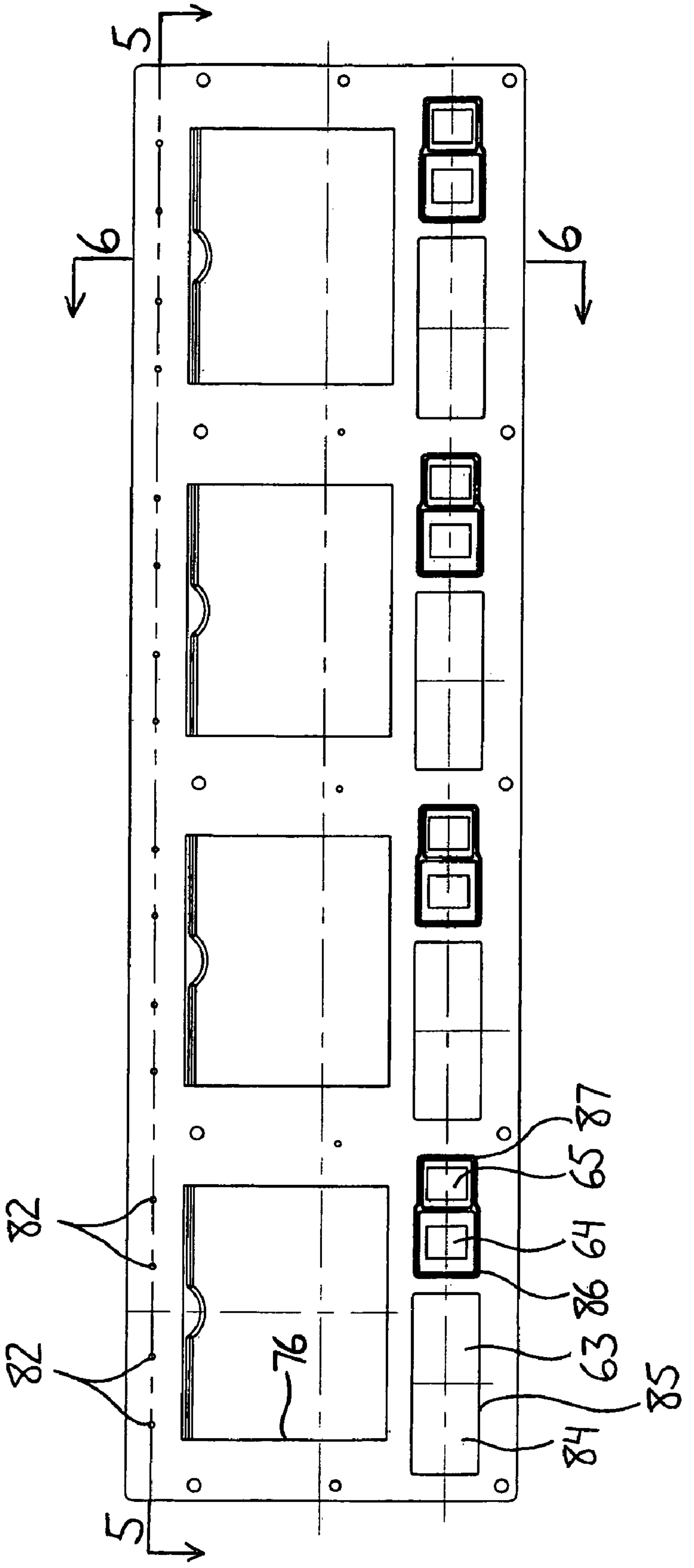
FIG. 4 is a front elevational view of one row of the array of display devices of the door of the machine of FIG. 1.
Figure 5:
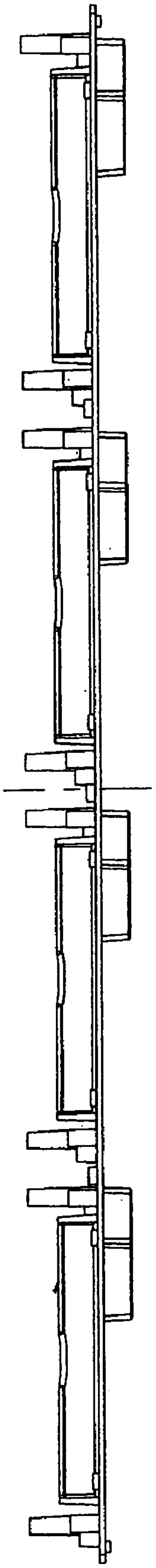
FIG. 5 is a cross sectional view along the lines 5-5 of FIG. 4.
Figure 6:
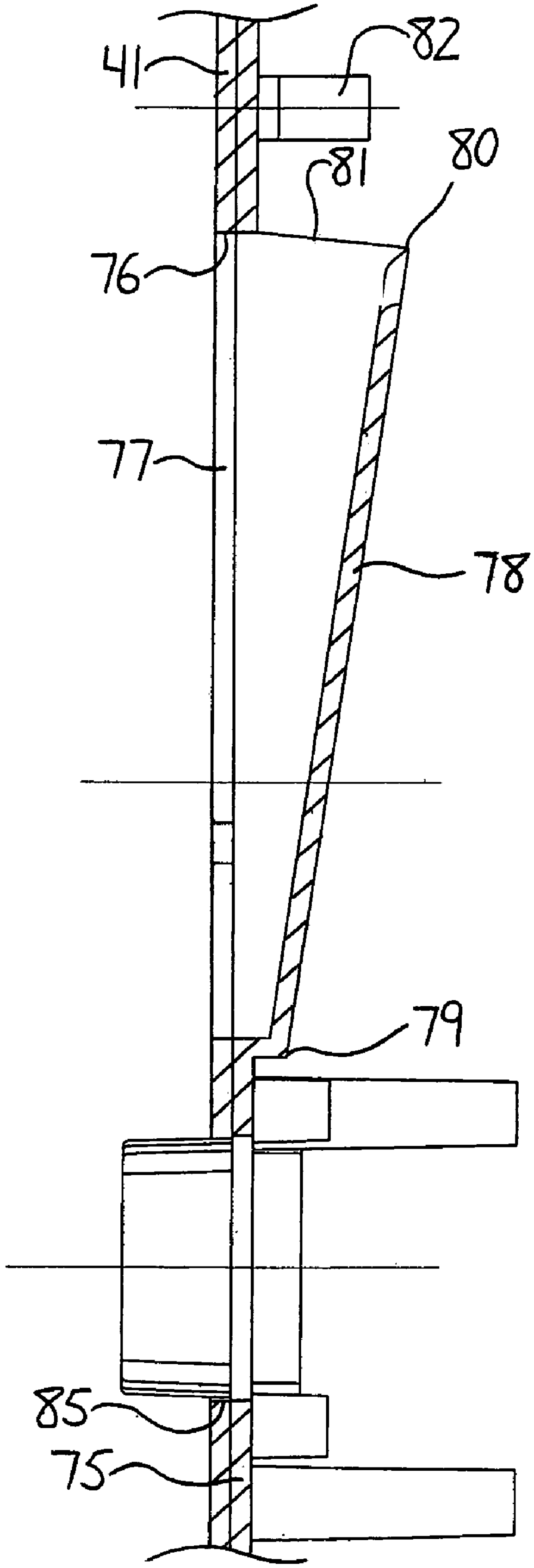
FIG. 6 is a cross sectional view along the lines 6-6 of FIG. 4.

Turning now to FIGS. 4, 5 and 6, there is shown an assembly which forms one row of the display devices for insertion into the openings forming the array 61 on the front panel 41 of the door. Thus the structure is formed to define a single row of the elements of the array and a series of the rows are provided for mounting one above the other to complete the full array. Thus the structure forms a base panel 75 formed from a plastic sheet which is molded to form a generally flat portion which is placed against and held in contact with the inside surface of the door. As best shown in FIG. 6, the door panel 41 includes an opening 76 closed by a window 77. The sheet 75 is fastened behind the surface of the wall 41. The sheet 75 carries a support surface 78 which has a bottom edge 79 connected to the sheet 75 and is inclined upwardly and outwardly to a top edge 80 spaced away from the sheet 75. This provides a mouth or slot 81 into which a printed card can be simply dropped by the operator from the interior of the door so that the bottom edge of the card drops to the bottom edge of the support surface 78 and the rear surface of the card lies against the surface 78. The height of the card is matched to the height of the surface and of course the width of the card is matched to the width of the window 76.

The sheet 75 also carries a circuit board in the form of a strip across the top of the mouth 81 with the circuit board providing a series of LEDs 82 positioned across the top of the slot 81. These LEDs thus provide illumination which is directed downwardly in front of the printed card lying against the surface 78. AS shown in FIG. 4, there are four such LEDs for each window. The LEDs themselves are not visible since they are behind the sheet 75 but the LEDs provide their illumination onto the printed card to provide an attractive appearance.

The sheet 75 also carries a further circuit board 84 which defines an LCD display. This is located alongside the switches 64 and 65 and below the window 76. It will be appreciated that the door surface 41 is cut to define further openings 85, 86 and 87 which cooperate with the LCD display 63 and the switches 64 and 65 so that these can be presented at the surface for viewing by the operator.

While the preferred embodiments of the invention have been described above, it will be recognized and understood that various modifications may be made therein, and the appended claims are intended to cover all such modifications which may fall within the spirit and scope of the invention.

The invention claimed is:

1. Apparatus for vending lottery tickets comprising:

a housing arranged for mounting at a location for vending of lottery tickets, the housing having an exterior surface for access by a purchasing customer and a secure interior;

a plurality of dispensing containers mounted within the secure interior, each arranged to receive a plurality of lottery tickets for dispensing of the tickets sequentially;

at least one dispensing device within the secure interior actuable to dispense the one or more tickets from the containers for receipt of the dispensed tickets by the purchasing customer;

a payment receiving device for effecting of a payment for selected tickets;

a plurality of separate display devices arranged so as to be visible on the outer surface of the housing in an array, each arranged for displaying graphics and information relating to a respective one of a plurality of different tickets available for purchase by the purchasing customer;

each display device having associated therewith a respective one of a plurality of customer actuated purchase switches actuable by the customer to effect purchase of the respective one of the plurality of different tickets;

each display device having associated therewith a respective one of a plurality of customer actuated information switches actuable by the customer;

a video display screen separate from the display devices and from the purchase switches and from the information switches;

a control unit within the housing including a memory and arranged for:

controlling the dispensing of the respective one of the tickets in response to the actuation of a selected one of the purchase switches by the customer and the receipt of payment from the customer; and displaying from the memory on the video display screen graphic information relating to a respective one of the tickets in response to the actuation of a selected one of the information switches by the customer;

and a control input interface inside the secure interior for operation by an authorized operator.

2. The apparatus according to claim 1 wherein each of the display devices is arranged to provide a static display of information related to the respective ticket.

3. The apparatus according to claim 1 wherein each of the display devices includes a printed card.

4. The apparatus according to claim 3 wherein each of the display devices includes a holder for a printed card.

5. The apparatus according to claim 4 wherein each holder includes at least one LED light arranged on the holder so as to illuminate a front surface of the printed card.

6. The apparatus according to claim 1 wherein each display device includes a transparent window in the exterior surface of the housing and a support surface for supporting the printed card behind the transparent window, the support surface defining a bottom edge and being inclined upwardly and rearwardly to define a slot at a top edge of the support surface into which the printed card can be inserted to rest against the support surface and each display device including a row of LED lights above the slot for illuminating the printed card.

7. The apparatus according to claim 1 wherein each display device includes a display panel actuable to display a price for the respective ticket.

8. The apparatus according to claim 1 wherein the control unit is arranged such that the graphic display on the video display screen includes a set of rules for the game related to the respective ticket.

9. The apparatus according to claim 1 wherein the control unit is arranged such that the graphic display on the video display screen includes a set of odds for the game related to the respective ticket.

10. The apparatus according to claim 1 wherein the control unit is arranged such that the graphic display on the video display screen includes advertising material for the game related to the respective ticket.

11. The apparatus according to claim 1 wherein the control unit is arranged such that the graphic display on the video display screen includes a prize structure for the game related to the respective ticket.

12. The apparatus according to claim 1 wherein the control unit is arranged such that the graphic display on the video display screen relates only to the single ticket selected.

13. The apparatus according to claim 1 wherein the control unit is arranged such that the graphic display on the video display screen includes audio related to the respective ticket.

14. The apparatus according to claim 1 wherein the housing includes a door mounted for hinged pivotal movement about one edge which can be moved to an open position by an authorized operator for exposing the secure interior, wherein the control unit is arranged such that the control input interface includes a display on the video display screen and wherein the video display screen is mounted such that the video display screen can be viewed by the customer from the exterior with the door closed and can be viewed by the authorized operator with the door open.

15. The apparatus according to claim 14 wherein the video display screen is mounted on the door and can be viewed by the customer from the exterior with the door closed through a transparent window in the door and wherein the video display screen is carried on a mounting which allows the video display screen to pivot relative to the door to face inwardly of the door to be viewed by the authorized operator with the door open.

16. The apparatus according to claim 1 wherein the control input interface includes a keyboard.

17. The apparatus according to claim 1 wherein there is provided a motion sensor on the housing arranged to detect the presence of a customer approaching the housing and wherein the wherein the control unit is arranged such that the graphic display on the video display screen is changed in response to detection of the presence of a customer by the motion sensor.

18. The apparatus according to claim 1 wherein the control input interface includes a USB port to receive graphic display information from a memory stick.

19. Apparatus for vending lottery tickets comprising:

a housing arranged for mounting at a location for vending of lottery tickets, the housing having an exterior surface for access by a purchasing customer and a secure interior;

a plurality of dispensing containers mounted within the secure interior, each arranged to receive a plurality of lottery tickets for dispensing of the tickets sequentially;

at least one dispensing device within the secure interior actuable to dispense the one or more tickets from the containers for receipt of the dispensed tickets by the purchasing customer;

a payment receiving device for effecting of a payment for selected tickets;

a plurality of separate display devices arranged so as to be visible on the outer surface of the housing in an array, each arranged for displaying graphics and information relating to a respective one of a plurality of different tickets available for purchase by the purchasing customer;

a control unit within the housing including a memory and arranged for controlling the dispensing of the respective one of the tickets in response to the actuation of a selected one of a plurality of purchase switches by the customer;

and a control input interface inside the secure interior for operation by an authorized operator;

wherein each of the display devices includes a holder for a printed card; wherein each display device includes a transparent window in the exterior surface of the housing and a support surface for supporting the printed card behind the transparent window;

the support surface defining a bottom edge and being inclined upwardly and rearwardly to define a slot at a top edge of the support surface into which the printed card can be inserted to rest against the support surface;

and wherein each display device includes a row of LED lights above the slot for illuminating the printed card.

20. Apparatus for vending lottery tickets comprising:

a housing arranged for mounting at a location for vending of lottery tickets, the housing having an exterior surface for access by a purchasing customer and a secure interior;

a plurality of dispensing containers mounted within the secure interior, each arranged to receive a plurality of lottery tickets for dispensing of the tickets sequentially;

at least one dispensing device within the secure interior actuable to dispense the one or more tickets from the containers for receipt of the dispensed tickets by the purchasing customer;

a payment receiving device for effecting of a payment for selected tickets;

a plurality of display devices arranged so as to be visible on the outer surface of the housing in an array, each arranged for displaying graphics and information relating to a respective one of a plurality of different tickets available for purchase by the purchasing customer;

customer actuated purchase switches actuable by the customer to effect purchase of the respective one of the plurality of different tickets;

a video display screen;

a control unit within the housing including a memory and arranged for controlling the dispensing of the respective one of the tickets in response to the actuation of a selected one of the purchase switches by the customer and displaying from the memory on the video display screen graphic information relating to the tickets; and a control input interface inside the secure interior for operation by an authorized operator;

wherein the housing includes a door mounted for hinged pivotal movement about one edge which can be moved to an open position by an authorized operator for exposing the secure interior, wherein the control unit is arranged such that the control input interface includes a display on the video display screen;

wherein the video display screen is mounted on the door and can be viewed by the customer from the exterior with the door closed through a transparent window in the door:

and wherein the video display screen is carried on a mounting which allows the video display screen to pivot relative to the door to face inwardly of the door to be viewed by the authorized operator with the door open.

* * * * *